United States Patent
Iwasaki

(10) Patent No.: US 9,635,272 B2
(45) Date of Patent: Apr. 25, 2017

(54) IMAGING DEVICE AND IMAGING METHOD CAPABLE OF GENERATING A BULB EXPOSURE IMAGE

(71) Applicant: Olympus Corporation, Hachioji-shi, Tokyo (JP)

(72) Inventor: Hiroaki Iwasaki, Hino (JP)

(73) Assignee: Olympus Corporation, Tokyo (JP)

(*) Notice: Subject to any disclaimer, the term of this patent is extended or adjusted under 35 U.S.C. 154(b) by 255 days.

(21) Appl. No.: 14/255,000

(22) Filed: Apr. 17, 2014

(65) Prior Publication Data

US 2014/0313367 A1 Oct. 23, 2014

(30) Foreign Application Priority Data

Apr. 18, 2013 (JP) .................. 2013-087300

(51) Int. Cl.
*H04N 5/235* (2006.01)
*H04N 5/243* (2006.01)

(52) U.S. Cl.
CPC ......... *H04N 5/2351* (2013.01); *H04N 5/2353* (2013.01); *H04N 5/2356* (2013.01); *H04N 5/243* (2013.01)

(58) Field of Classification Search
CPC ........ H04N 5/235; H04N 5/353; H04N 5/335; G03B 7/00; G03B 9/58; G03B 2207/00; H01L 27/146
See application file for complete search history.

(56) References Cited

U.S. PATENT DOCUMENTS

| 8,515,270 B1* | 8/2013 | Posehn .................. G03B 15/00 396/48 |
| 2012/0113296 A1* | 5/2012 | Kunishige .......... H04N 5/23245 348/234 |

FOREIGN PATENT DOCUMENTS

| JP | 2000-261715 | 9/2000 |
| JP | 2005-117395 | 4/2005 |

* cited by examiner

*Primary Examiner* — Mekonnen Dagnew
(74) *Attorney, Agent, or Firm* — John C. Pokotylo; Straub & Pokotylo

(57) ABSTRACT

An imaging device of the present invention, using image data that has been continuously read out at specified time intervals from an image sensor, generates relatively dark combination image data resulting from relatively dark combination using darker pixel data of each pixel of image data is generated, and relatively bright combination image data resulting from relatively bright combination using brighter pixel data of each pixel of image data, and difference output image data is generated from the relatively bright combination image data and the relatively dark combination image data. With the generated relatively dark combination image data as background image data and the difference output image data as light trace output image data, respective brightness is adjusted, and by subjecting each of the image data after adjustment to addition combination, it is possible to respectively independently adjust background brightness and light trace brightness.

6 Claims, 7 Drawing Sheets

FIG. 5A
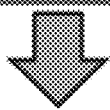
SUCCESSIVE IMAGES→IMAGE COMBINATION
FIG. 5B
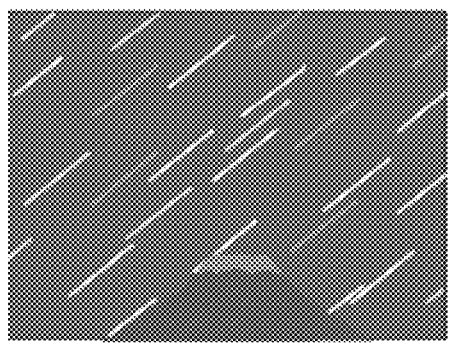
FIG. 5C
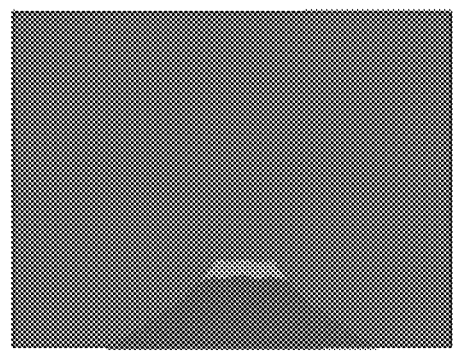
FIG. 5D
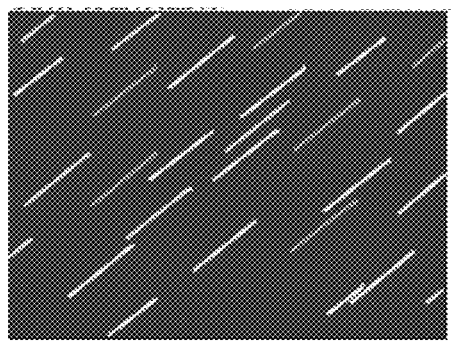

IMAGING DEVICE AND IMAGING METHOD CAPABLE OF GENERATING A BULB EXPOSURE IMAGE

Benefit is claimed, under 35 U.S.C. §119, to the filing date of prior Japanese Patent Application No. 2013-087300 filed on Apr. 18, 2013. This application is expressly incorporated herein by reference. The scope of the present invention is not limited to any requirements of the specific embodiments described in the application.

BACKGROUND OF THE INVENTION

1. Field of the Invention

The present invention relates to an electronic imaging device such as a digital camera, and in particular relates to an imaging device and imaging method capable of generating a bulb exposure image with relatively bright composition, and capable of arbitrary exposure adjustment.

2. Description of the Related Art

Conventionally, with a single lens reflex type imaging device observing a subject image has been performed using an optical viewfinder. However, imaging devices for observing a subject image not through an optical viewfinder but by live view display for displaying an image that as been read from an image sensor using a rear surface liquid crystal monitor or the like have recently become available on the market. Also, instead of an optical view finder, imaging devices have also become available on the market that display an image through live view display using an electronic view finder that is separate from a rear surface liquid crystal monitor, and are capable of switching between display using the above described rear surface liquid crystal monitor and display using the electronic viewfinder.

Conventionally, regardless of whether an optical view finder or an electronic viewfinder is used, at the time of a prolonged exposure, such as with a bulb exposure, it was not possible to read image data from the image sensor during exposure, which meant that it was not possible to confirm the state of the subject or exposure conditions, and an image was only confirmed upon completion of shooting. As a result, for the photographer setting of exposure values such as aperture and ISO sensitivity, and deciding when to start and stop the exposure, need to be decided by the photographer themselves confirming from subject brightness etc., and it is not an easy matter to obtain a desired image without having an exposure ruined due to insufficient exposure or over exposure.

In order to address this type of drawback, therefore, the imaging device disclosed in Japanese patent laid-open No. 2005-117395 (hereafter referred to as patent literature 1) reads image data from an image sensor at specified time intervals, carries out simple cumulative addition of image data every time that this image data is read out from the image sensor, and displays an image obtained in this way on a liquid crystal monitor or the like, so as to be able to display the course of exposure.

Also, with the imaging device disclosed in Japanese patent No. 4148586 (hereafter referred to as patent literature 2), image data is continuously read out from an image sensor, and bulb exposure image data is generated with relatively bright composition. This relatively bright composition is image composition where brightness levels for every pixel of image data are compared, and those with large brightness are selected to give a brightness level after composition.

With the imaging device disclosed in patent literature 1, it is possible to notify current exposure information to the photographer during a bulb exposure as progression information, and it is possible to alleviate failures such as under exposure and over exposure. However, a subject for bulb exposure is generally shooting light trails of fireworks launched into the night sky or light trails of stars, and as well the length of light trails becoming longer with increased exposure time, there are variations in brightness of the background (the night sky in these cases). In this type of situation, it is necessary to complete the exposure in an exposure time that ensures that the brightness of the background is not over exposed or under exposed, and the length of light trails will be determined by the brightness of the background regardless of the artistic intentions of the photographer.

Contrary to this, with the imaging device disclosed in patent literature 2, for image data that is read out continuously from the image sensor, brightness levels are compared for every pixel of the image data, and brighter pixels are selected and set for the brightness level after combination, to generate taken image data of relatively bright composition. Therefore, regardless of exposure time, brightness of a background will be maintained at the brightness of a single image before combining, and it is possible to trace light trails by setting an exposure time in line with the creative intentions of the photographer.

However, with either of the imaging devices of patent literature 1 or 2, when the photographer shoots as intended in accordance with background brightness and light trace length, respectively, it is necessary to adjust aperture and ISO sensitivity to match subject brightness, and to adjust exposure time for shooting a single image before combination. This adjustment requires long years of photography experience or confirmation of brightness using preview, and requires advanced shooting technology.

Also, in order to carry out shooting in a dark environment, such as stars and fireworks, if an image is confirmed in a bright environment such as in the daytime or indoors, then in order for a taken image to appear at a brightness that is different to that at the time of shooting, shooting will often be carried out at a brightness that does not conform with the shooting intention.

SUMMARY OF THE INVENTION

The present invention has been conceived to solve the above described problems, and an object thereof is to provide an imaging device and an imaging method that prevent exposure failures for bulb exposure that have a high degree of difficulty, and that enable shooting of a photograph in accordance with the photographer's intentions.

An imaging device of the present invention comprises: an image sensor; a relatively bright combination processing section for storing first image data that has been initially generated based on image data read out from the image sensor as cumulative relatively bright combination image data, comparing pixel data respectively corresponding to a plurality of pixel data constituting second image data generated based on image data read out from the image sensor and a plurality of pixel data constituting the cumulative relatively bright combination image data, making the larger of the pixel data new pixel data, and sequentially repeating relatively bright combination processing, for reconstituting the cumulative relatively bright combination image data, on the second image data of a second and subsequent frames that have been generated based on image data readout from the image sensor; a relatively dark combination processing section for storing first image data that has been initially generated based on image data read out from the image sensor as cumulative relatively dark combination image data, comparing pixel data respectively corresponding to a plurality of pixel data constituting second image data generated based on image data read out from the image sensor and a plurality of pixel data constituting the cumulative relatively dark combination image data, making the smaller of the pixel data new pixel data, and sequentially repeating relatively dark image combination processing, for reconstituting the cumulative relatively dark combination image data, on the second image data of a second and subsequent frames that have been generated based on image data read out from the image sensor; a difference image combination section for calculating differences between pixel data respectively corresponding to pixel data constituting the cumulative relatively bright combination image data and pixel data constituting the cumulative relatively dark combination image data to generate new difference image data; and an image combination section for combining image data obtained by multiplying the cumulative relatively dark combination image data by an arbitrary gain value and image data obtained by multiplying the difference image data by an arbitrary gain value.

An imaging device of the present invention comprises: an image sensor; a relatively bright combination processing section for storing first image data that has been initially generated based on image data that has been read out from the image sensor as cumulative relatively bright combination image data, comparing differences between pixel data respectively corresponding to a plurality of pixel data constituting second image data that has been generated based on image data read out from the image sensor and a plurality of pixel data constituting the cumulative relatively bright combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative relatively bright combination image data and making the larger pixel data new pixel data, when the difference is smaller the specified value making an average value of pixel data respectively corresponding to pixel data constituting the second image data created based on image data that has been readout from the image sensor and pixel data constituting the cumulative relatively bright combination image data new pixel data, and sequentially repeating relatively bright image combination processing for reconstituting the cumulative relatively bright combination image data on the second image data for a second and subsequent frame generated based on image data that has been read out from the image sensor; a relatively dark combination processing section for storing first image data that has been initially generated based on image data that has been read out from the image sensor as cumulative relatively dark combination image data, comparing differences between pixel data respectively corresponding to a plurality of pixel data constituting second image data that has been generated based on image data read out from the image sensor and a plurality of pixel data constituting the cumulative relatively dark combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative relatively dark combination image data and making the larger pixel data new pixel data, when the difference is smaller than the specified value making an average value of pixel data respectively corresponding to pixel data constituting the second image data created based on image data that has been read out from the image sensor and pixel data constituting the cumulative relatively dark combination image data new pixel data, and sequentially repeating relatively dark image combination processing for reconstituting the cumulative relatively dark combination image data on the second image data for a second and subsequent frame generated based on image data that has been readout from the image sensor; a difference image combination section for generating new difference image data by calculating differences between respective pixel data for a plurality of pixel data constituting the cumulative relatively bright combination image data and a plurality of pixel data constituting the cumulative relatively dark combination image data; and an image combination section for combining image data obtained by multiplying the cumulative relatively dark combination image data by an arbitrary gain value and image data obtained by multiplying the difference image data by an arbitrary gain value.

An imaging method of the present invention comprises: a relatively bright combination processing step of storing first image data that has been initially generated based on image data read out from the image sensor as cumulative relatively bright combination image data, comparing pixel data respectively corresponding to a plurality of pixel data constituting second image data generated based on image data read out from the image sensor and a plurality of pixel data constituting the cumulative relatively bright combination image data, making the larger of the pixel data new pixel data, and sequentially repeating relatively bright combination processing, for reconstituting the cumulative relatively bright combination image data, on the second image data of a second and subsequent frames that have been generated based on image data read out from the image sensor; a relatively dark combination processing step of storing first image data that has been initially generated based on image data read out from the image sensor as cumulative relatively dark combination image data, comparing pixel data respectively corresponding to a plurality of pixel data constituting second image data generated based on image data read out from the image sensor and a plurality of pixel data constituting the cumulative relatively dark combination image data, making the smaller of the pixel data new pixel data, and sequentially repeating relatively dark image combination processing, for reconstituting the cumulative relatively dark combination image data, on the second image data of a second and subsequent frames that have been generated based on image data read out from the image sensor; a difference image combination step of calculating differences between pixel data respectively corresponding to pixel data constituting the cumulative relatively bright combination image data and pixel data constituting the cumulative relatively dark combination image data to generate new difference image data; and an image combination step of combining image data obtained by multiplying the cumulative relatively dark combination image data by an arbitrary gain value and image data obtained by multiplying the difference image data by an arbitrary gain value.

An imaging method of the present invention comprises: a relatively bright combination processing step of storing first image data that has been initially generated based on image data that has been read out from the image sensor as cumulative relatively bright combination image data, comparing differences between pixel data respectively corresponding to a plurality of pixel data constituting second image data that has been generated based on image data read out from the image sensor and a plurality of pixel data constituting the cumulative relatively bright combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative relatively bright combination image data and making the larger pixel data new pixel data, when the difference is smaller the specified value making an average value of pixel data respectively corresponding to pixel data constituting the second image data created based on image data that has been read out from the image sensor and pixel data constituting the cumulative relatively bright combination image data new pixel data, and sequentially repeating relatively bright image combination processing for reconstituting the cumulative relatively bright combination image data on the second image data for a second and subsequent frame generated based on image data that has been read out from the image sensor; a relatively dark combination processing step of storing first image data that has been initially generated based on image data that has been read out from the image sensor as cumulative relatively dark combination image data, comparing differences between pixel data respectively corresponding to a plurality of pixel data constituting second image data that has been generated based on image data read out from the image sensor and a plurality of pixel data constituting the cumulative relatively dark combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative relatively dark combination image data and making the larger pixel data new pixel data, when the difference is smaller than the specified value making an average value of pixel data respectively corresponding to pixel data constituting the second image data created based on image data that has been readout from the image sensor and pixel data constituting the cumulative relatively dark combination image data new pixel data, and sequentially repeating relatively dark image combination processing for reconstituting the cumulative relatively dark combination image data on the second image data for a second and subsequent frame generated based on image data that has been read out from the image sensor; a difference image combination step of generating new difference image data by calculating differences between respective pixel data for a plurality of pixel data constituting the cumulative relatively bright combination image data and a plurality of pixel data constituting the cumulative relatively dark combination image data; and an image combination step of combining image data obtained by multiplying the cumulative relatively dark combination image data by an arbitrary gain value and image data obtained by multiplying the difference image data by an arbitrary gain value.

BRIEF DESCRIPTION OF THE DRAWINGS

FIG. 5A-FIG. 5D are drawings showing relatively bright and dark combinations, with the camera of the first embodiment of the present invention, with FIG. 5A showing an image before combination, FIG. 5B showing an image for relatively bright combination, FIG. 5C showing an image for relatively dark combination, and FIG. 5D showing a difference component output image resulting from subtracting the relatively dark combination image from the relatively bright combination image.

DETAILED DESCRIPTION OF THE PREFERRED EMBODIMENTS

Preferred embodiments using a camera to which the present invention has been applied will be described in the following in accordance with the drawings. A camera of a preferred embodiment of the present invention is a digital camera, and performs live view display of image data on a display section based on image data that has been read out from an image sensor, and also stored image data, that has been subjected to image processing for storage in response to operation of a release button, in an external memory. Also, if a relatively bright combination mode has been set as bulb exposure mode, then during the bulb exposure relatively bright combination image data is created by relatively bright combination using brighter pixels of each pixel of image data, and it is possible to carry out progressive display of exposure state during bulb exposure using this image data.

Further, this camera generates relatively dark combination image data by relatively dark combination using darker pixels of each pixel of image data, and creates difference output image data from the relatively bright combination image data and the relatively dark combination image data. The generated relatively dark combination image data is made background output image data, and the difference output image data is made light trace output image date, respective brightness is adjusted, and by combining each image data after adjustment it is possible to adjust background brightness and light trace brightness respectively independently for relatively bright combination image data acting as a reference.

Figure 1:
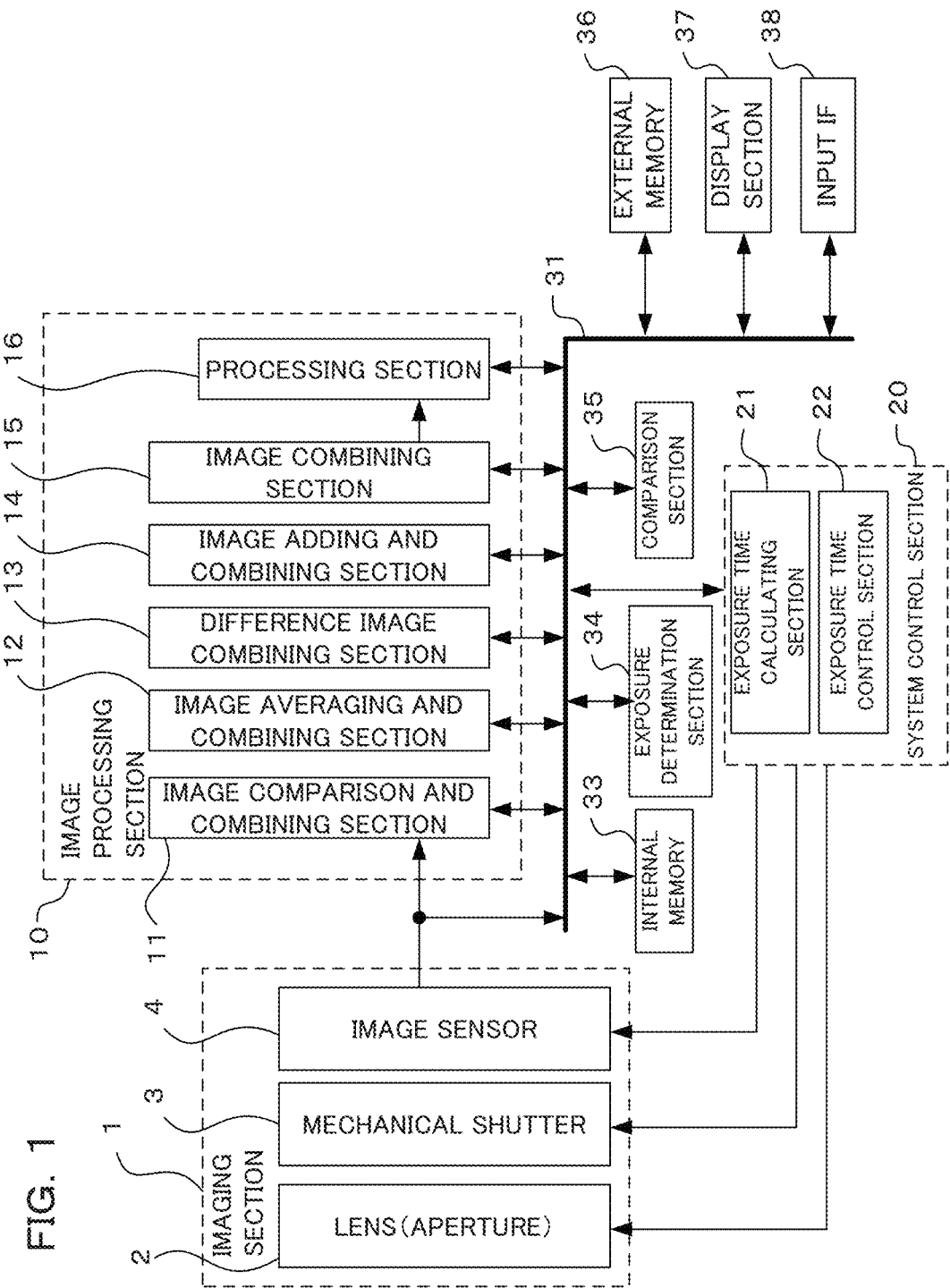
FIG. 1 is a block diagram mainly showing the electrical structure of a camera of a first embodiment of the present invention.

FIG. 1 is a block diagram mainly showing the electrical structure of a camera of a first embodiment, as a preferred embodiment of the present invention. The camera of this embodiment has an imaging section 1, an image processing section 10, a system control section 20, and a bus 31, and respective sections connected to these elements.

A lens 2 forms an optical image of a subject on an image sensor 4. A diaphragm for determining aperture value for adjusting exposure amount is provided within this lens 2. Also, a mechanical shutter 3 exposes or shields light to the image sensor 4 by an opening and closing operation, and controls shutter speed. The image sensor 4 includes an image sensor such as a CMOS image sensor or a CCD image sensor, and converts an optical image of a subject that has been formed by the lens 2 into electrical signals for every pixel, before outputting image data to the image processing section 10 and the bus 31. The bus 31 is a signal line for exchanging signals between each block.

The image processing section 10 subjects image data that has been output from the image sensor 4 to image processing, and has an image comparison and combination section 11, an image averaging and combining section 12, a difference image combining section 13, an image adding and combining section 14, an image combination section 15, and a processing section 16.

The image comparison and combination section 11 compares image data that has been sequentially read out from the image sensor 4 and outputs for each pixel of image data that has been saved in an internal memory 33, performs relatively bright processing and relatively dark combination processing on each pixel, and generates combined image data using relatively bright combination image data and relatively dark combination image data that have been generated by these processes.

Specifically, with the relatively bright processing of the image comparison and combination section 11, pixel data constituting image data that has been generated based on image data read out from the image sensor 4 is initially stored in the internal memory 33 as relatively bright combination image data. Next, pixel data respectively corresponding to pixel data constituting image data that has been generated based on image data output from the image sensor 4 and a plurality of pixel data constituting cumulative relatively bright combination image data stored in the internal memory 33 are compared. If the result of comparing the respectively corresponding pixel data is that a difference between them is greater than or equal to a specified value, larger, namely brighter, pixel data is detected, and cumulative relatively bright combination image data is reconstituted using this brighter pixel data. On the other hand, if the result of comparing the respectively corresponding pixel data in the image comparison and combination section 11 is that a difference between them is smaller than the specified value, the corresponding pixel data is rewritten to an average value calculated by the image averaging and combining section 12. This processing is repeatedly carried out every time image data is read out from the image sensor 4. By carrying out relatively bright processing, it is possible to obtain an image of light traces of stars in the night sky (refer to FIG. 5B, which will be described later).

Also, with the relatively dark processing of the image comparison and combination section 11, pixel data constituting image data that has been generated based on image data initially read out from the image sensor 4 is stored in the internal memory 33 as relatively dark combination image data. Next, pixel data respectively corresponding to pixel data constituting image data that has been generated based on image data output from the image sensor 4 and a plurality of pixel data constituting cumulative relatively dark combination image data stored in the internal memory 33 are compared. If the result of comparing the respectively corresponding pixel data is that a difference between them is greater than or equal to a specified value, smaller, namely darker, pixel data is detected, and cumulative relatively dark combination image data is reconstituted using this darker pixel data. On the other hand, if the result of comparing the respectively corresponding pixel data in the image comparison and combination section 11 is that a difference between them is smaller than the specified value, the corresponding pixel data is rewritten to an average value calculated by the image averaging and combining section 12. This processing is repeatedly carried out every time image data is readout from the image sensor 4. By carrying out relatively dark processing, it is possible to remove light traces of stars in the night sky and obtain a background image (refer to FIG. 5C which will be described later).

The image averaging and combining section 12, when a result of comparing respectively corresponding pixel data for a plurality of pixel data constituting cumulative relatively bright combination image data or cumulative relatively dark combination image data is that the difference between them is smaller than the specified value, calculates an average value of corresponding pixel data.

The difference image combining section 13 calculates a difference output for each pixel of relatively bright combination image data and relatively dark combination image data, to generate difference image data. Specifically, the difference image data is image data that is acquired by calculating a difference of the relatively dark combination image data from the relatively bright combination image data for each pixel data, and is image data of only light traces with background image data removed (refer to FIG. 5D, which will be described later).

The image adding and combining section 14 adds outputs for each pixel to create added combination data. Specifically, the image adding and combining section 14 adds image data every time image data is read out from the image sensor 4 in specified periods, to generate the added combination data. By performing display based on this added combination data, it is possible to carry out exposure progression display at the time of a bulb exposure. The exposure progression display based on this added combination data will be omitted from the flowcharts that will be described later (refer to FIG. 2 and FIG. 3).

The image combination section 15 respectively multiplies the relatively dark combination image data and the difference image data by a gain, and carries out addition processing. Relatively dark combination image data that has been created by the image comparison and combination section 11 is image data constituting only a background, with moving bright sections removed (refer to FIG. 5C), and difference image data is for moving bright sections, namely, image data constituting light traces (refer to FIG. 5D). By carrying out addition processing to multiply these image data by respective gains, it is possible to adjust brightness of a light trace portion and a background portion independently of each other. This adjustment will be described later using FIG. 4A to FIG. 6B and S43~S55 in FIG. 3.

The processing section 16 carries out processing such as demosaicing, white balance adjustment, gamma correction and image compression on RAW image data that has been generated in the image combination section 15.

The internal memory 33 temporarily stores various setting information required in camera operation, and currently being processed image data at the time of image processing. The internal memory 33 is constituted by an electrically rewritable nonvolatile memory such as flash memory or SDRAM.

An external memory 36 is an electrically rewritable non-volatile storage medium that can be removed from the camera body or is fixed inside the camera, such as, for example an SD card or a CF card. This external memory 36 stores image data that has been subjected to processing by the processing section 16, and at the time of playback it is possible to read stored image data and output outside the camera.

A display section 37 is a rear surface display section such as TFT (Thin Film Transistor) liquid crystal or organic EL, or an EVF (electronic viewfinder), and displays images that have been processed by the processing section 16.

An input IF 38 has operating members such as a release button and a touch panel for inputting touch operations on a rear surface display section etc., and carries out various mode settings and instruction of exposure operation such as release, based on user operation.

An exposure determination section 34 determines whether or not optimal exposure has been achieved from image data that has been read out from the image sensor 4 or output of image data generated by each section. A comparison section 35 compares output differences for pixel data of a plurality of image data for comparison and combination. It is also possible to compare output differences of each pixel with specified values (thresholds).

The system control section 20 has a CPU (Central Processing Unit), and carries out overall control of the camera in accordance with program stored in the internal memory 33. The system control section 20 also has an exposure time calculation section 21 and an exposure time control section 22. The exposure time calculation section 21 calculates an appropriate exposure time (shutter speed) from an exposure determination result of the exposure determination section 34. The exposure time control section 22 controls opening and closing timing processing of the mechanical shutter 3 in accordance with the calculation result by the exposure time calculation section 21. The exposure time calculation section 21 and the exposure time control section 22 may be processes performed by software, and may be processes performed by hardware.

Next, an overview of operation of the camera shown in FIG. 1 will be described. On the basis of control by the system control section 20, adjustment of a focus lens constituting the lens 2 is carried out, an aperture is set to a specified value, the mechanical shutter 3 is opened, and an optical image is converted to electrical signals by the image sensor 4. Image data that has been read out from the image sensor 4 is subjected to prescribed image processing in the image processing section 10, and stored in the external memory 36. Also, image data that has been subjected to prescribed image processing by the image processing section 10 is displayed on the display section 37 after being resized.

The system control section 20 carries out timing control, such as receipt of instructions from the user via the input IF 38, commencement of exposure of the image sensor 4, signal readout etc., opening and closing timing control of the mechanical shutter 3, and aperture control and auto focus control of the lens 2. The system control section 20 also carries out control such as acquiring image data from the image processing section 10 and image display by the display section 37, and saving of image data to the external memory 36.

Next, the flow of processing of the camera of this embodiment will be described using the flowcharts shown in FIG. 2 and FIG. 3. These flowcharts are executed by the system control section 20 controlling each section in accordance with programs stored in the internal memory 33.

These flowcharts illustrates a sequence for the case where the user has selected bulb exposure mode using the input IF, and relatively bright combination mode has been selected during bulb exposure mode. Regarding bulb exposure modes, normal bulb exposure where progressive display is not carried out during exposure, and addition combination display mode where progressive display is carried out during exposure with added images, have been omitted. If addition combination display mode, which is one type of progressive display mode, has been selected, image data is read out from the image sensor 4 at regular periods during bulb exposure, and by sequentially adding this read-out image data it is possible to display that a screen is gradually becoming brighter as the exposure time elapses on the display section 37. With relatively bright combination mode, which is one type of progressive display mode, it is possible to adjust the length of light traces in accordance with exposure time, while keeping the brightness of a background constant regardless of exposure time.

When performing bulb exposure, the user adjusts camera orientation and focal length (zoom) of the lens in order to be able to confirm the subject on the display section 37 or an optical viewfinder (not shown) in advance and shoot the subject they want to shoot. Also, as required, shooting information such as position of the focus lens, aperture value and ISO sensitivity may be set via the input IF 38, such as buttons and a touch panel.

Figure 2:
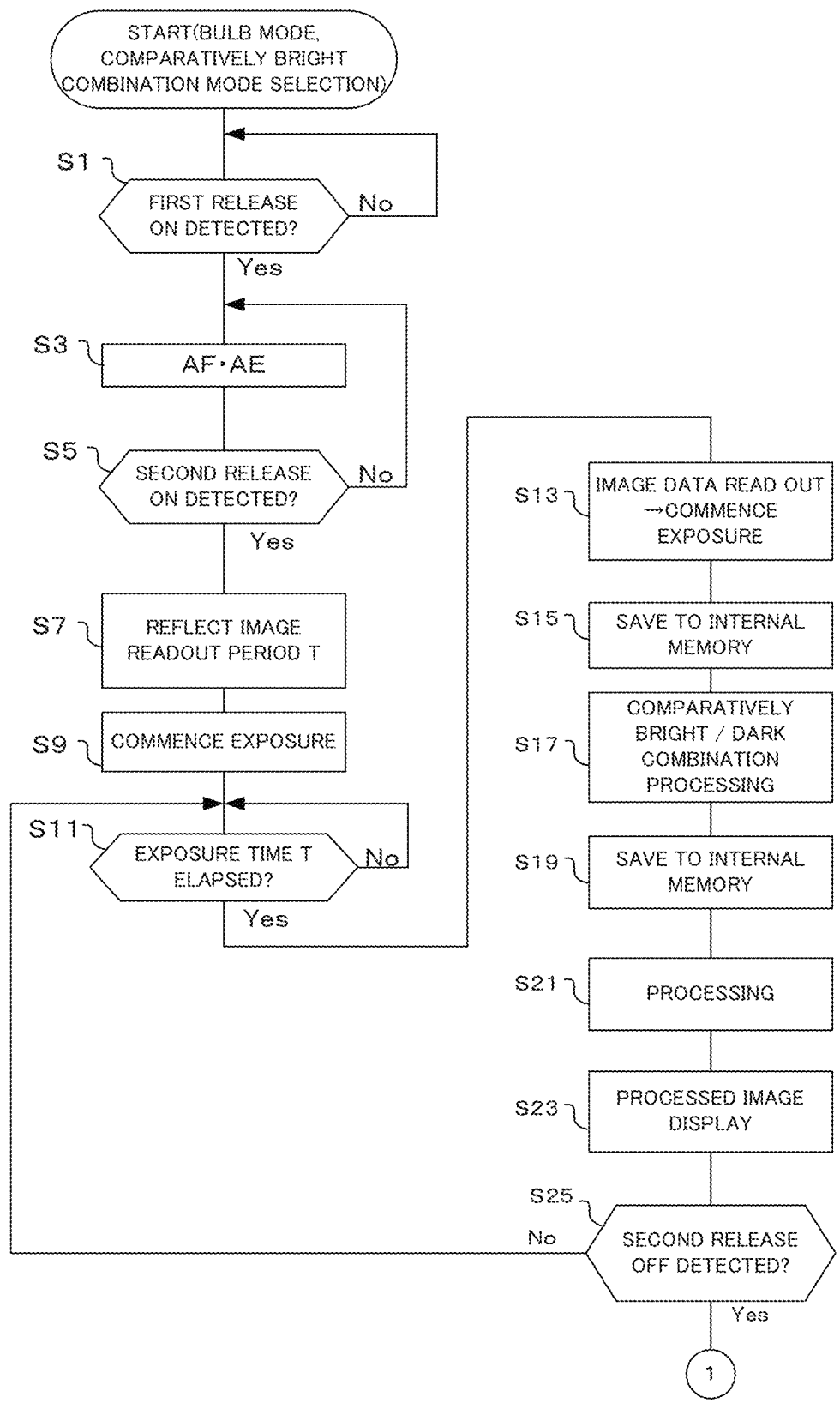
FIG. 2 is a flow chart showing operation of the camera of the first embodiment of the present invention in a case where a relatively bright combination mode is selected in bulb mode.
Figure 3:
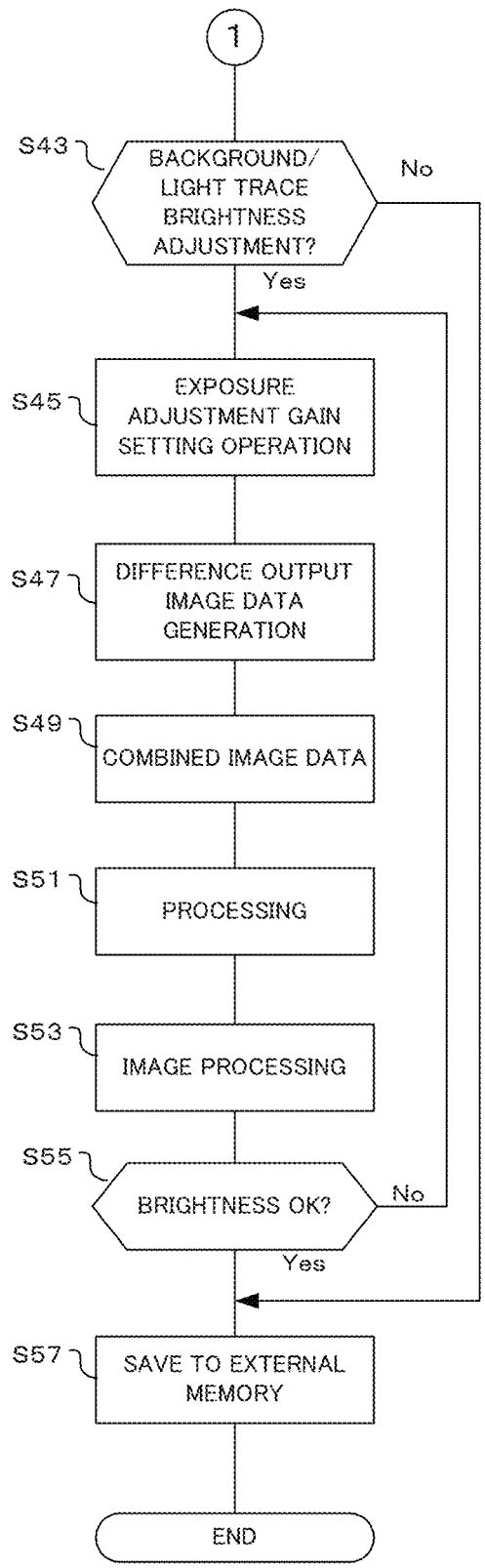
FIG. 3 is a flow chart showing operation of the camera of the first embodiment of the present invention in a case where a relatively bright combination mode is selected in bulb mode.

If the processing flow shown in FIG. 2 is entered, the system control section 20 determines whether or not a 1st release switch is on in response to an initial pressing operation of a release switch (S1). If the result of this determination is not ON, a standby state is entered.

If the result of determination in step S1 is that the first release switch is on, then next AF and AE are carried out (S3). Here, the system control section 20 carries out AF (autofocus), to focus on a subject. At the time of AF, the system control section 20 drives a focus lens within the lens 2 so that a contrast value of image data that is repeatedly read from the image sensor 4 becomes a maximum value. AE (automatic exposure control) is also carried out, to calculate an exposure time and aperture etc. to achieve appropriate exposure.

Once AF and AE been carried out, it is next determined whether or not a 2nd release switch is on (S5). Here, the system control section 20 determines whether or not the second release which has been turned on by a relatively stronger pressing operation than the initial pressing operation. If the result of this determination is not that the second release which is ON, processing returns to step S3 and AF and AE operations are repeated.

If the result of determination in step S5 is that the 2nd release switch is ON, relatively bright combination is carried out using relatively bright combination mode. First, an image readout period T is reflected (S7). This period T is a period for reading out image data from the image sensor 4, and may be a value that has been set manually by the user, or may be a value corresponding to an appropriate exposure time that has been calculated for AE in step S3.

Once the image readout period has been reflected, exposure is commenced (S9). Here, the system control section 20 commences exposure of the image sensor 4. Once exposure has commenced, it is next determined whether or not the exposure time T has elapsed (S11). Here, it is determined whether or not a time T has elapsed after the exposure commencement of step S9. A standby state is entered until the time T has elapsed.

If the result of determination in step S11 is that the exposure time T has elapsed, then image data is read out and exposure is commenced for the next frame (S13). Image data that was read out in step S13 is then saved in the internal memory 33 (S15).

Once the image data has been saved to the internal memory 33, next relatively bright/dark combination processing is carried out (S17). However, in a case where image data has been read initially out from the image sensor 4 in relatively bright combination mode, relatively bright/dark combination processing is skipped and relatively bright/dark combination processing is carried out for the second and subsequent frames. This second and subsequent frame relatively bright/dark combination processing is carried out, after the lapse of time T, on image data that has been readout in step S13, and on image data stored in the internal memory 33 (cumulative relatively bright combination image data and cumulative relatively dark combination data), in the event that the result of determination in step S25, which will be described later, was NO.

The second and subsequent frame relatively bright/dark processing is carried out as follows. Image data for a first frame and a second frame is temporarily stored in the internal memory 33. The system control section 20 transmits first frame and second frame read-out image data that was temporarily stored in the internal memory 33 to a comparison section 35, compares pixel outputs for the same addresses in two images, selects the larger pixel data as pixel data for an image after combination, and obtains this the relatively bright combination image data (cumulative relatively bright combination image data). Also, the pixel outputs for the same addresses in two images are compared and the smaller pixel data are selected as image data for an image after combination, and made the relatively dark combination image data (cumulative relatively dark combination image data).

The relatively bright combination image data and relatively dark combination image data that was generated in step S17 are saved to the internal memory 33 (S19).

Once the data has been saved to the internal memory, processing is carried out (S21). Here, the system control section 20 causes processing such as demosaicing processing, ν correction processing, noise reduction processing, YC signal generation processing, and resizing processing to be carried out by the processing section 16 on the image data that has been temporarily stored in the internal memory 33. Resizing processing is in order to make the number of pixels of image data that has been read out match the number of display pixels of a display element, because the number of image pixels is larger than the number of display pixels of a liquid crystal display or an electronic viewfinder.

Once processing has been carried out, display of a processed image is next carried out (S23). Here, the system control section 20 causes a relatively bright combination image that has been processed by the processing section 16 to be displayed on the display section 37 as an exposure time-lapse image. The user can confirm a relatively bright combination image as a progression image at the time of bulb exposure.

Once processed image display has been carried out, it is next determined whether or not turning off of the second release switch has been detected (S25). With this embodiment, bulb exposure lasts from when the user strongly presses the release button until it is released, that is, bulb exposure is commenced if the second release switch is turned on, and bulb exposure is completed when the second release switch is turned off. It is also possible to have a configuration where initially, after the second release switch has been turned on, bulb exposure continues even if the second release switch is turned off, and bulb exposure is completed when the second release switch is turned on again.

If the result of determination in step S25 is not that the second release switch is off, step S11 is returned to. Third and subsequent frame image data is also read from the image sensor after the exposure time T has elapsed (S13) and saved to the internal memory 33 (S15). Relatively bright combination processing of image data that has been read out from the image sensor 4 and cumulative relatively bright combination image data that has been saved to the internal memory 33 so far (if it is combined image data for the third frame, relatively bright combination image data for the first and second frames) is carried out by the comparison section 35 (S17), and saved to the internal memory 33 as cumulative relatively bright combination image data (S19). This saved cumulative relatively bright combination image data is then subjected to processing (S21), and displayed on the display section 37 as exposure time-lapse image (S23). Also, similarly, relatively dark combination processing of image data that has been read out from the image sensor 4 and cumulative relatively dark combination image data (if it is combined image data for the third frame, relatively dark combination image data for the first and second frames) is carried out (S17), and saved to the internal memory 33 as cumulative relatively dark combination image data (S19).

In this way, during bulb exposure image data is read out from the image sensor 4 every time the time T elapses, relatively bright combination processing and relatively dark combination processing are carried out, and an image that has been subjected to relatively bright combination processing is displayed on the display section 37 as an exposure time-lapse image.

If the result of determination in step S25 is that the second release switch being off has been detected, bulb exposure termination processing is carried out.

Figure 4A:
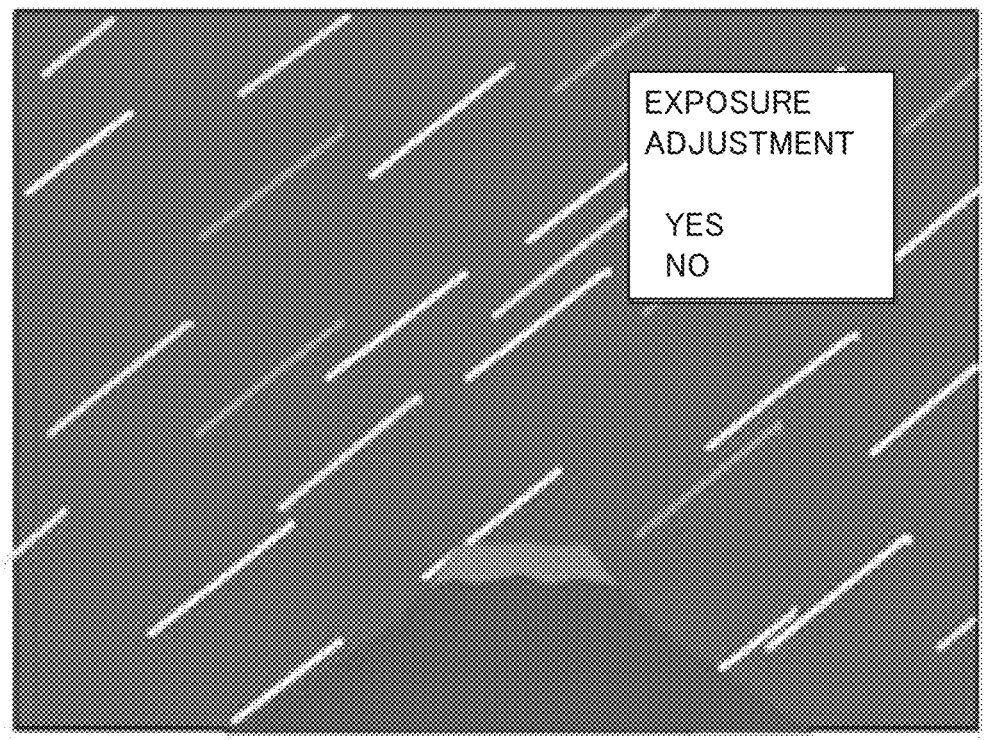
FIG. 4A and FIG. 4B are drawings showing operation screens at the time of exposure adjustment with the camera of the first embodiment of the present invention, with FIG. 4A being an exposure adjustment required or not required confirmation screen, and FIG. 4B being an exposure adjustment operation screen.

First, in step S43 and afterwards, exposure adjustment processing is carried out. With this exposure adjustment processing it is possible to independently adjust brightness of the background or light trace portions of a final taken image. First, it is determined whether or not to adjust brightness of the background and light traces (S43). In this step, since an adjustment requirement screen (for example, the exposure adjustment requirement screen as shown in FIG. 4A) is displayed on the display section 37, the user confirms whether they intend to adjust the background and light trace brightness while looking at this exposure adjustment requirement screen. If the image is as the user intends, then exposure adjustment "NO" is selected using the input IF 38 (S43→No). In this case, the cumulative relatively bright combination image data and the processed image data thereof are saved to an external memory, and exposure is completed.

Figure 4B:
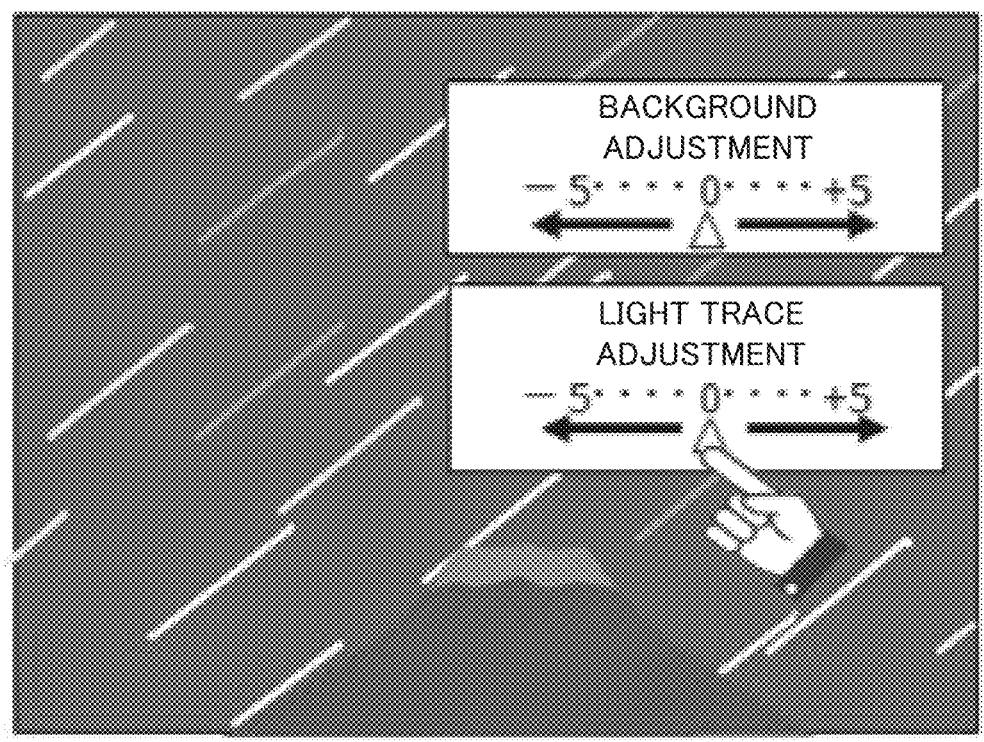

On the other hand, if the result of determination in step S43 is that exposure adjustment "YES" has been selected (S43→Yes), background and light trace adjustment screens (for example, the exposure adjustment operation screen shown in FIG. 4B) are displayed on the display section 37.

If an exposure adjustment gain setting operation is performed in this state, that setting operation amount is acquired (S45). With the example shown in FIG. 4B, adjustment indicators are shown for background and light traces respectively. If the user instructs to increase brightness by performing a slide operation of the indicator to the right, or to decrease brightness by performing the slide operation to the left, the system control section 20 inputs the users instructions via a touch panel within the input IF 38.

The system control section 20 changes adjustment amount for brightness of the background and light traces that have been input by the user's operation to an adjustment gain for changing how much brighter an image is being displayed. If adjustment gain of the background is made α and adjustment gain of the light traces is made β, then in a case of an input indicating that it is desired to adjust the brightness of the background by +1 step and the brightness of the light traces by −1 step, conversion is carried out using α=2 and β=0.5

Next, once an exposure adjustment gain setting operation has been carried out, next creation of difference output image data is carried out (S47). Here, the system control section 20 inputs relatively bright combination image data and relatively dark combination image data to the difference image combining section 13, where difference output image data is generated using equation (1) below, and saved to the internal memory 33.

difference output image data=relatively bright combination image data−relatively dark combination image data (1)

Here, if respective image data before combination that has been read out at exposure time T have no places where brightness of the background varies, as in FIG. 5, the relatively dark combination image data (FIG. 5C) corresponds to image data reflecting brightness of the background with light traces removed. On the other hand, difference output image data (FIG. 5D) is image data obtained by subtracting the background (relatively dark combination image data) (FIG. 5C) from the relatively bright combination image data (FIG. 5B) for every corresponding pixel, and so constitutes image data portraying only light traces.

If difference output image data has been generated in step S47, next generation of combined image data is carried out (S49). Here, the system control section 20 outputs relatively dark combination image data and difference output image data that have been saved to the internal memory 33 to the image combination section 15, where combined image data is generated in accordance with equation (2) shown below. Specifically, additive combination of two sets of image data, namely image data obtained by multiplying the relatively dark combination image data by an adjustment gain α, and image data obtained by multiplying the difference output image data by an adjustment gain β, is carried out to generate combined image data. This generated combined image data is saved to the internal memory 33.

combined image data=(relatively dark combination image data×α)+(difference output image data×β) (2)

Here, A+B represents added combined image data of image data A and image data B.

By means of the above-described combination, it is possible to generate image data in which background brightness adjusted image data (relatively dark combination image data×α) and light trace brightness adjusted image data (difference output image data×β) have been combined, to generate image data that has had brightness adjusted in accordance with a user's operation.

Once combined image data has been generated in step S49, next processing is carried out (S51), and image display is carried out on the display section 37 (S53). Once image display has been carried out it is next is determined whether or not brightness is OK (S55). Here, as shown in FIG. 4A, since the adjustment screen is displayed again, the user confirms an image for which brightness has been adjusted and if further adjustment is required performs a touch operation on exposure adjustment "YES". If brightness of the combined image is insufficient or excessive, step S45 is returned to, and after input of brightness adjustment values background and light trace brightness are adjusted again.

Figure 6A:
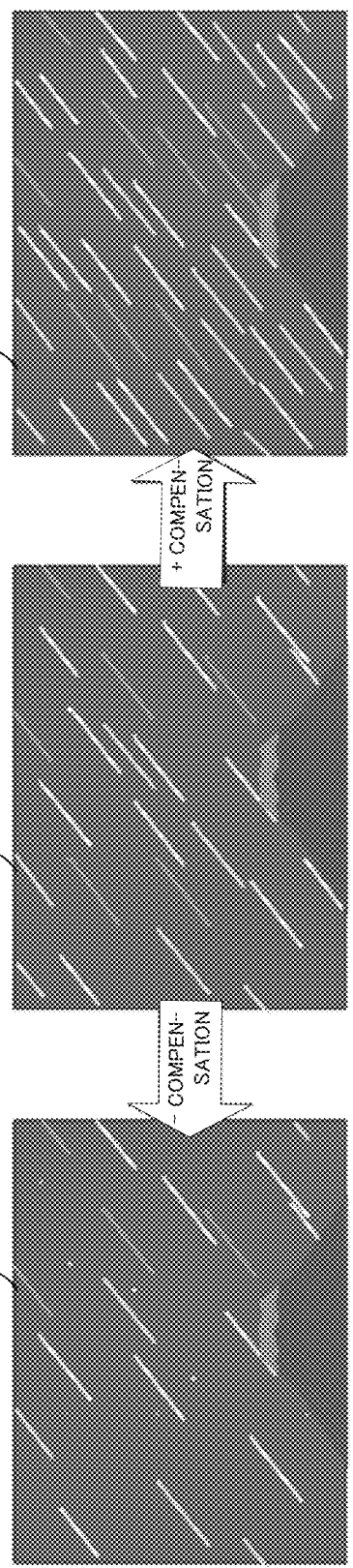
FIG. 6A and FIG. 6B are drawings for describing exposure adjustment with the camera of the first embodiment of the present invention, FIG. 6A showing adjustment of light trace brightness, and FIG. 6B showing adjustment of background brightness.
Figure 6B:
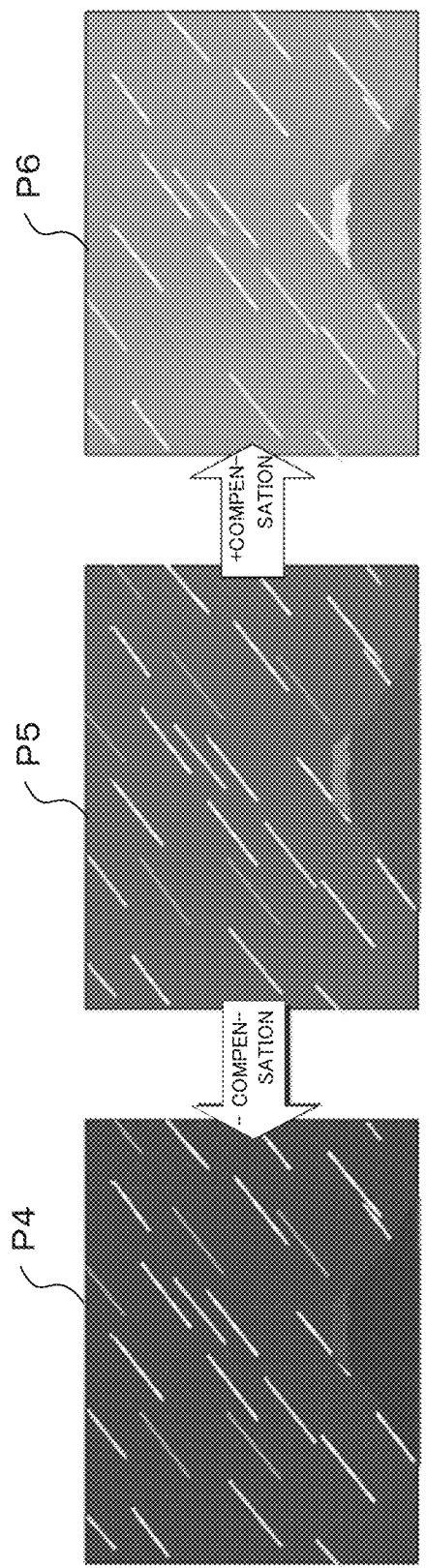

Examples of background and light trace adjustment are shown in FIG. 6A and FIG. 6B. FIG. 6A is an example of light trace brightness adjustment, and here a plurality of light traces are adjusted. Image P2 is a base image, image P1 has been subjected to negative correction, and image P3 has been subjected to positive correction. As will be understood from FIG. 6A, it is possible to adjust only the light traces without varying the brightness of the background.

Also, FIG. 6B is an example of background brightness adjustment. Image P5 is a base image (the same image as P2), image P4 has been subjected to negative correction, and image P6 has been subjected to positive correction. As will be understood from FIG. 6B, it is possible to adjust only the background brightness without varying the light trace brightness.

On the other hand, in the event that it has been determined in step S55 that brightness has been adjusted in line with the user's intentions, a touch operation is performed on exposure adjustment "NO", within the screen shown in FIG. 4A by means of the input IF 38. In this case, the result of determination in step S55 becomes brightness OK, a combined image or the processed image thereof are saved to the external memory 36 (S57), and exposure is completed.

In this way, with the first embodiment of the present invention, as shown in FIG. 6A and FIG. 6B, it is possible for the user to adjust respective brightness of a background and light traces in accordance with creative concept after exposure, while checking a relatively bright combination image. It is therefore possible to prevent ruined shots due to failed exposure of a highly difficult bulb exposure, and to achieve a photograph that is as the photographer intended.

Next, a modified example of the first embodiment of the present invention will be described. With the first embodiment, at the time of carrying out relatively bright/dark combination in the image comparison and combination section 11, pixel data was compared for every pixel by the comparison section 35, and it was determined whether the pixel data was large or small. Differing from this, with this modified example difference pixel data of associated pixel data output being compared is calculated, this difference pixel data is compared with a threshold level (specified level) TH in the comparison section 35, pixel data that is larger than the threshold level is set to a level that is a relatively bright or dark combination by the image comparison and combination section 11, and pixels that are smaller than the threshold level are used to calculate an average value by the image averaging and combining section 12, and this average value is made the image output after combination. Specifically, the processing shown below is carried out.

difference pixel data $TH\rightarrow$relatively bright/dark combination difference pixel data$<TH\rightarrow$average combination The image data that has been readout from the image sensor 4 contains random noise. For a background with no brightness variations, with relatively bright combination of a plurality of image data maximum values of random noise are reflected in the cumulative relatively bright combination image data, and with relatively dark combination minimum values of random noise are reflected in the cumulative relatively dark combination image data. Therefore, with this modified example, by setting the threshold level TH to a value of the random noise, image quality degradation due to random noise is suppressed, and it is possible to improve the image quality of the final combined image.

Next, a second embodiment of the present invention will be described using FIG. 7. With the first embodiment, exposure time for a single frame from the image sensor 4 (read period T) was constant during a bulb exposure. With the second embodiment, however, exposure time for a single frame from the image sensor 4 is varied in accordance with surrounding brightness.

Specifically, with the first embodiment, during exposure from when the 2nd release which is turned on until it is turned off, in the case where background brightness varies, for example, in situations such as taking pictures of heavenly bodies at dusk or at night time, or when there is a large fireworks display, and background brightness varies, at the time of photographing an extremely bright background the background is reflected in the final cumulative relatively bright combination image data. On the other hand, when photographing an extremely dark background, that background is reflected in cumulative relatively dark combination image data. Difference combined image data is differences between these image data, and includes differences in variation of background brightness accompanying light trace output.

In the case where the user performs adjustment of background and light trace brightness using this difference combined image data, as was described in the first embodiment, not only the light trace brightness but also brightness of the background is varied, and combined image data that is not what the photographer intended is generated. With the second embodiment therefore, in order to address this issue, variation in image brightness at the time of relatively bright or dark combination is made as small as possible by varying the exposure time for a single frame in accordance with the surrounding brightness.

Figure 7:
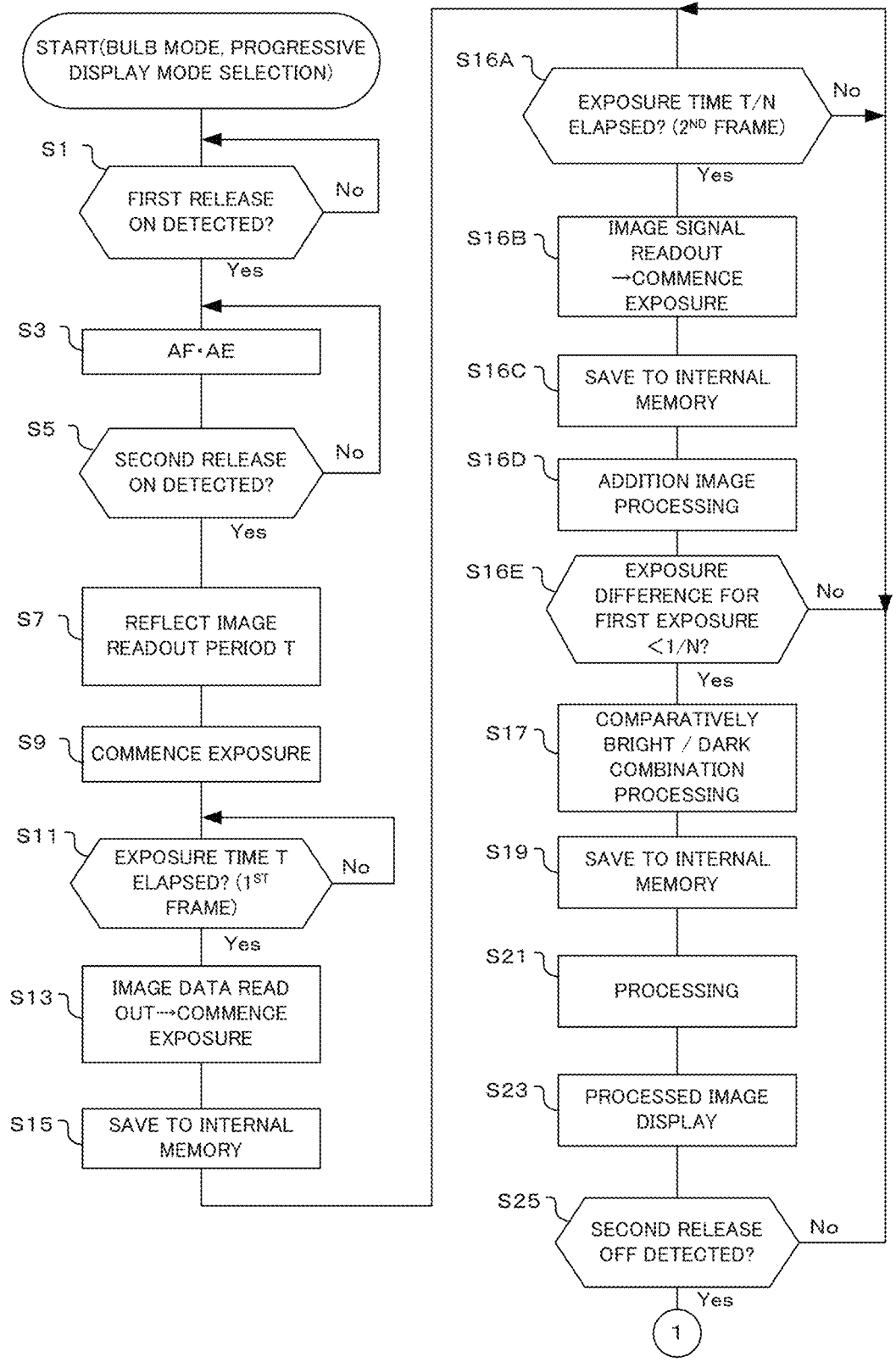
FIG. 7 is a flow chart showing operation of the camera of a second embodiment of the present invention in a case where bulb mode is selected.

The structure of this embodiment is the same as the block diagram shown in FIG. 1 for the first embodiment, and the flowchart shown in FIG. 2 is simply replaced with FIG. 7. Also, the flowchart of FIG. 7 only has steps S16A~S16E added to the flowchart shown in FIG. 2, and description will center on these points of difference.

Having entered the flow shown in FIG. 7, image readout period is reflected in step S7, exposure is commenced (S9), and if the exposure time T for the first frame has elapsed (S11) then together with reading out image data, exposure for the next photograph is commenced (S13), and image data that has been read out is saved to the internal memory 33 (S15).

If image data has been saved to the internal memory in step S15, it is determined whether or not exposure time for the second and subsequent frames has passed T/N (16A). Here, N is an integer, and T/N is a shorter time than the time T. The image sensor 4 carries out exposure for the first frame at time T, and carries out exposure for the second and subsequent frames at a time T/N.

If the result of determination in step S16A is that the exposure time T/N has elapsed, then image data is read out and exposure is commenced for the next frame (S16B). Read-out image data is saved to the internal memory 33 (S16C).

Once the read-out image data is saved to the internal memory, the image data is subjected to addition image processing (S16D). Here, read-out image data of the second and subsequent frames is added by the image adding and combining section 14. Specifically, image data is added every time data is read out in step S16B. This added image data is saved to the internal memory 33, and will be used at the time of the next addition image processing.

Once addition image processing has been carried out, it is determined whether or not an exposure difference between this addition image data and image data for the first frame that was stored into the internal memory 33 in step S15 is smaller than 1/N (S16E). Here, the comparison section 35 carries out comparison of exposure amount for image data that was acquired using the exposure for the first frame, and exposure amount for image data that was acquired using the addition image processing. Comparison is performed in the comparison section 35 by calculating an exposure difference using equation (3) shown below.

$$\text{exposure difference} = \{(\text{exposure amount of first frame image data}) - (\text{exposure amount of addition combined image data})\} / (\text{exposure amount of first frame image data}) \quad (3)$$

Calculation of exposure amount may calculate an average value of image pixel output using an AE (photometry) method that is built in to recent digital cameras.

If the result of determination in step S16E is that the exposure difference is greater than or equal to 1/N, step S16A is returned to and the above described addition combination processing is repeated. In this way, the exposure amount for the addition combined image data gradually increases.

When the result of determination in step S16E is that the exposure difference is less than 1/N, the addition combined image data is saved to the internal memory 33, relatively bright/dark combination is carried out using this addition combined image data and read out image data for the first frame (S17), and saved to the internal memory 33 as respective cumulative relatively bright combination image data and cumulative relatively dark combination image data (S19).

After that, until the second release switch is turned off, addition combined image data having an exposure time difference from that of the first frame of less than 1/N is generated using the above described sequence for image data that has been read out every time T/N (N is an integer), and cumulative relatively dark combination and cumulative relatively bright combination processing are carried out. If the result of determination in step S25 is that the second release which has been turned off, step S31 and afterwards shown in FIG. 3 are executed. This flow is the same as that of the first embodiment and so description is omitted, but background and light trace brightness are adjusted in accordance with the photographer's intentions and final image data is saved to the external memory 36.

In this way, with the second embodiment, by carrying out relatively bright combination and relatively dark combination of addition combined image data having a background brightness that is close to the brightness of a taken image of the first frame (exposure difference less than 1/N), it is possible to prevent the creation of combined image data that is not what the photographer intended, even if there is variation in background brightness As has been described above, with each of the embodiments on the modified example of the present invention, using image data that has been continuously read out at specified time intervals from an image sensor, relatively dark combination image data resulting from relatively dark combination using darker pixel data of each pixel of image data is generated, and relatively bright combination image data resulting from relatively bright combination using brighter pixel data of each pixel of image data is generated, and difference output image data is generated from the relatively bright combination image data and the relatively dark combination image data (for example, refer to S35 and S47 of FIG. 3, FIG. 5B, FIG. 5C and FIG. 5D). Therefore, with the generated relatively dark combination image data as background image data and the difference output image data as light trace output image data, respective brightness is adjusted, and by subjecting each of the image data after adjustment to addition combination, it is possible to respectively independently adjust background brightness and light trace brightness with respect to relatively bright combination image data constituting a reference. It is therefore made possible to prevent ruined bulb exposures, that are very difficult, and to achieve a photograph in line with the photographer's intention.

Also, when generating the combination of the relatively dark combination image data and the relatively bright image data, comparison is carried out for associated pixel data of the same address, and larger or smaller pixel data are used. This makes it possible to simplify the structure and speed up the processing. Also, in the combination of the relatively dark combination image data and the relatively bright image data, in a case where a difference between associated pixel data exceeds the specified value, relatively dark combination image data or relatively bright combination image data is generated using larger or smaller pixel data, while when a difference between associated pixel data is less than the specified value the relatively dark combination image data all the relatively bright combination image data is generated using an average value of the pixel data. By performing determination using difference values, it is possible to reduce the effects of pixel noise.

With each of the embodiments and the modified example of the present invention, once relatively bright/dark combination processing has been carried out only the newest cumulative relatively bright combination image data/cumulative relatively dark combination image data is stored (step S19 in FIG. 2, S37 in FIG. 3, S19 in FIG. 7), but it is also possible to store a previous series of cumulative bright combination image data/cumulative dark combination image data, and after completion of bulb exposure to generate respective difference output image data based on these image data, and for the user to select the image data they prefer.

Also, with each of the embodiments and the modified example of the present invention, display of a relatively bright combination image is given as image display, but this is not limiting, and it is also possible a relatively dark combination image or a difference output image if selected by the user.

Further, with each embodiment and the modified example of the present invention, a device for taking pictures has been described using a digital camera, but as a camera it is also possible to use a digital single lens reflex camera, a mirrorless camera or a compact digital camera, or a camera for movie use such as a video camera, and further to have a camera that is incorporated into a mobile phone, a smartphone, a mobile information terminal (PDA: Personal Digital Assistant), game console etc. In any event, it is possible to adopt the present invention as long as a device is capable of shooting with bulb exposure.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they may be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising:
   an image section including
      an image sensor, and
      a lens; and
   an image processor including
      a bright image combination processing section that stores first image data that has been initially generated based on image data read out from the image sensor as cumulative bright image combination image data, comparing pixel data respectively corresponding to a plurality of pixel data constituting second image data generated based on image data read out from the image sensor and a plurality of pixel data constituting the cumulative bright image combination image data, making a larger of the pixel data within the respective corresponding pixel data new pixel data, and sequentially repeating relatively bright combination processing, for reconstituting the cumulative bright image combination image data, on the second image data of a second and subsequent frames that have been generated based on image data read out from the image sensor,
      a dark image combination processing section that stores first image data that has been initially generated based on image data read out from the image sensor as cumulative dark image combination image data, comparing pixel data respectively corresponding to a plurality of pixel data constituting second image data generated based on image data read out from the image sensor and a plurality of pixel data constituting the cumulative dark image combination image data, making a smaller of the pixel data within the respective corresponding pixel data new pixel data, and sequentially repeating dark image combination processing, for reconstituting the cumulative dark image combination image data, on the second image data of a second and subsequent frames that have been generated based on image data read out from the image sensor,
      a difference image combination section that calculates differences between pixel data respectively corresponding to pixel data constituting the cumulative bright image combination image data and pixel data constituting the cumulative dark image combination image data to generate new difference image data, and an image combination section that combines image data obtained by multiplying the cumulative dark image combination image data by a first gain value and image data obtained by multiplying the difference image data by a second gain value.

2. The imaging device of claim 1, wherein the image processor further includes an image addition and combination section for adding image data acquired by carrying out exposure plurality of times, and wherein the first image data is obtained by shooting at an exposure time that gives an appropriate exposure, and addition image data when absolute values of a difference between addition image data, obtained by adding third image data obtained by carrying out exposure a plurality of times at an exposure time that is shorter than the exposure time that gives an appropriate exposure in the image adding and combining section, and the first image data is within a specified range, is made the second image data.

3. An imaging device, comprising:
an image section including
an image sensor, and
a lens; and
an image processor including
a bright image combination processing section that stores first image data that has been initially generated based on image data that has been read out from the image sensor as cumulative bright image combination image data, comparing differences between pixel data respectively corresponding to a plurality of pixel data constituting second image data that has been generated based on image data read out from the image sensor and a plurality of pixel data constituting the cumulative bright image combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative bright image combination image data and making a larger of the pixel data within the respective corresponding pixel data new pixel data, when the difference is smaller the specified value making an average value of pixel data respectively corresponding to pixel data constituting the second image data created based on image data that has been read out from the image sensor and pixel data constituting the cumulative bright image combination image data new pixel data, and sequentially repeating relatively bright image combination processing for reconstituting the cumulative bright image combination image data on the second image data for a second and subsequent frame generated based on image data that has been read out from the image sensor, a dark image combination processing section that stores first image data that has been initially generated based on image data that has been read out from the image sensor as cumulative relatively dark combination image data, comparing differences between pixel data respectively corresponding to a plurality of pixel data constituting second image data that has been generated based on image data read out from the image sensor and a plurality of pixel data constituting the cumulative dark image combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative dark image combination image data and making the larger pixel data new pixel data, when the difference is smaller than the specified value making an average value of pixel data respectively corresponding to pixel data constituting the second image data created based on image data that has been read out from the image sensor and pixel data constituting the cumulative dark image combination image data new pixel data, and sequentially repeating dark image combination processing for reconstituting the cumulative dark image combination image data on the second image data for a second and subsequent frame generated based on image data that has been read out from the image sensor, a difference image combination section that generates new difference image data by calculating differences between respective pixel data for a plurality of pixel data constituting the cumulative bright image combination image data and a plurality of pixel data constituting the cumulative dark image combination image data, and an image combination section that combines image data obtained by multiplying the cumulative dark image combination image data by a first gain value and image data obtained by multiplying the difference image data by a second gain value.

4. The imaging device of claim 3, wherein the image processor further includes an image addition and combination section for adding image data acquired by carrying out exposure plurality of times, and wherein the first image data is obtained by shooting at an exposure time that gives an appropriate exposure, and addition image data when absolute values of a difference between addition image data, obtained by adding third image data obtained by carrying out exposure a plurality of times at an exposure time that is shorter than the exposure time that gives an appropriate exposure in the image adding and combining section, and the first image data is within a specified range, is made the second image data.

5. An imaging method comprising:
a bright image combination processing step of storing first image data that has been initially generated based on image data read out from the image sensor as cumulative bright image combination image data, comparing pixel data respectively corresponding to a plurality of pixel data constituting second image data generated based on image data read out from the image sensor and a plurality of pixel data constituting the cumulative bright image combination image data, making a larger of the pixel data within the respective corresponding pixel data new pixel data, and sequentially repeating bright image combination processing, for reconstituting the cumulative bright image combination image data, on the second image data of a second and subsequent frames that have been generated based on image data read out from the image sensor;

a dark image combination processing step of storing first image data that has been initially generated based on image data read out from the image sensor as cumulative dark image combination image data, comparing pixel data respectively corresponding to a plurality of pixel data constituting second image data generated based on image data read out from the image sensor and a plurality of pixel data constituting the cumulative dark image combination image data, making the smaller of the pixel data new pixel data, and sequentially repeating dark image combination processing, for reconstituting the cumulative dark image combination image data, on the second image data of a second and subsequent frames that have been generated based on image data read out from the image sensor;

a difference image combination step of calculating differences between pixel data respectively corresponding to pixel data constituting the cumulative bright image combination image data and pixel data constituting the cumulative dark image combination image data to generate new difference image data; and an image combination step of combining image data obtained by multiplying the cumulative dark image combination image data by a first gain value and image data obtained by multiplying the difference image data by a second gain value.

6. An imaging method comprising:

a bright image combination processing step of storing first image data that has been initially generated based on image data that has been read out from the image sensor as cumulative bright image combination image data, comparing differences between pixel data respectively corresponding to a plurality of pixel data constituting second image data that has been generated based on image data read out from the image sensor and a plurality of pixel data constituting the cumulative bright image combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative bright image combination image data and making the larger pixel data new pixel data, when the difference is smaller the specified value making an average value of pixel data respectively corresponding to pixel data constituting the second image data created based on image data that has been read out from the image sensor and pixel data constituting the cumulative bright image combination image data new pixel data, and sequentially repeating bright image combination processing for reconstituting the cumulative bright image combination image data on the second image data for a second and subsequent frame generated based on image data that has been read out from the image sensor;

a dark image combination processing step of storing first image data that has been initially generated based on image data that has been read out from the image sensor as cumulative dark image combination image data, comparing differences between pixel data respectively corresponding to a plurality of pixel data constituting second image data that has been generated based on image data read out from the image sensor and a plurality of pixel data constituting the cumulative dark image combination image data with a specified value, when the difference is greater than or equal to the specified value comparing pixel data respectively corresponding to a plurality of pixel data constituting the second image data generated based on image data that has been read from the image sensor and a plurality of pixel data constituting the cumulative dark image combination image data and making the larger pixel data new pixel data, when the difference is smaller than the specified value making an average value of pixel data respectively corresponding to pixel data constituting the second image data created based on image data that has been read out from the image sensor and pixel data constituting the cumulative dark image combination image data new pixel data, and sequentially repeating dark image combination processing for reconstituting the cumulative dark image combination image data on the second image data for a second and subsequent frame generated based on image data that has been read out from the image sensor;

a difference image combination step of generating new difference image data by calculating differences between respective pixel data for a plurality of pixel data constituting the cumulative bright image combination image data and a plurality of pixel data constituting the cumulative dark image combination image data; and an image combination step of combining image data obtained by multiplying the cumulative dark image combination image data by a first gain value and image data obtained by multiplying the difference image data by a second gain value.

* * * * *